Figure 3:
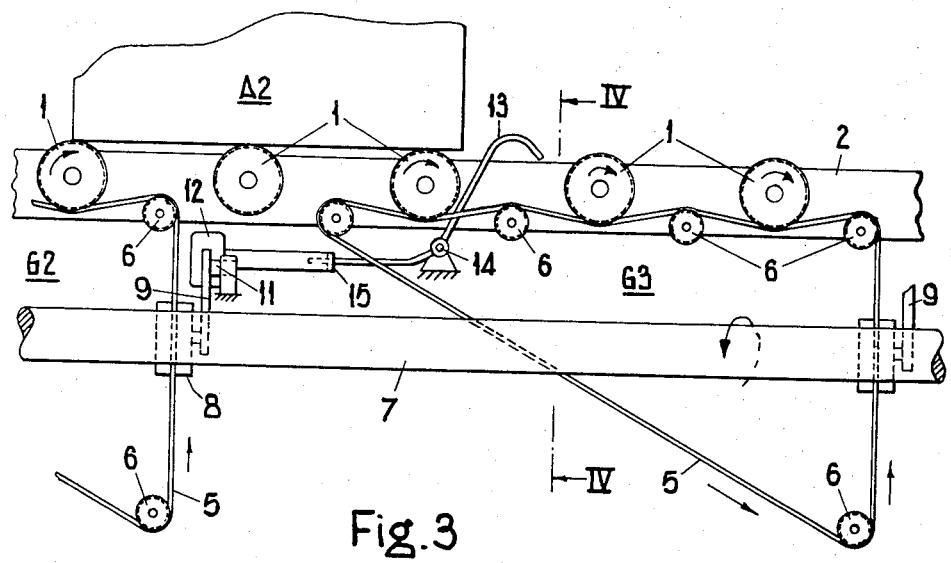

United States Patent [19]
Moyes

[11] 3,810,538
[45] May 14, 1974

[54] CONVEYORS

[75] Inventor: Martin Gerald Moyes, Melksham, England

[73] Assignee: Gec-Elliott Mechanical Handling Limited, Melksham, England

[22] Filed: Sept. 25, 1972

[21] Appl. No.: 291,769

[52] U.S. Cl. .................... 198/127 R, 74/242.11 W
[51] Int. Cl. ............................................ B65g 13/02
[58] Field of Search ....... 198/127; 74/242 L, 242 W

[56] References Cited
UNITED STATES PATENTS

| | | | |
|---|---|---|---|
| 2,655,815 | 10/1953 | McClelland | 74/242.11 W |
| 3,621,982 | 11/1971 | Fleischuer | 198/127 R |
| 3,643,788 | 2/1972 | Werntz | 198/127 R |

Primary Examiner—Richard E. Aegerter
Attorney, Agent, or Firm—Kirschstein, Kirschstein, Ottinger & Frank, P.C.

[57] ABSTRACT

A roller conveyor in which successive groups of one or more rollers are each associated with individual endless belts, each belt being associated with means for pressing it into contact with an associated drive means so as to cause it to drive the respective roller or rollers, and the conveyor including sensing means which, on the detection of the presence of an article on a group of rollers, causes the belt of the preceding group to be disengaged from the respective drive means, so as to arrest the drive to the roller or rollers of said preceding group.

5 Claims, 4 Drawing Figures

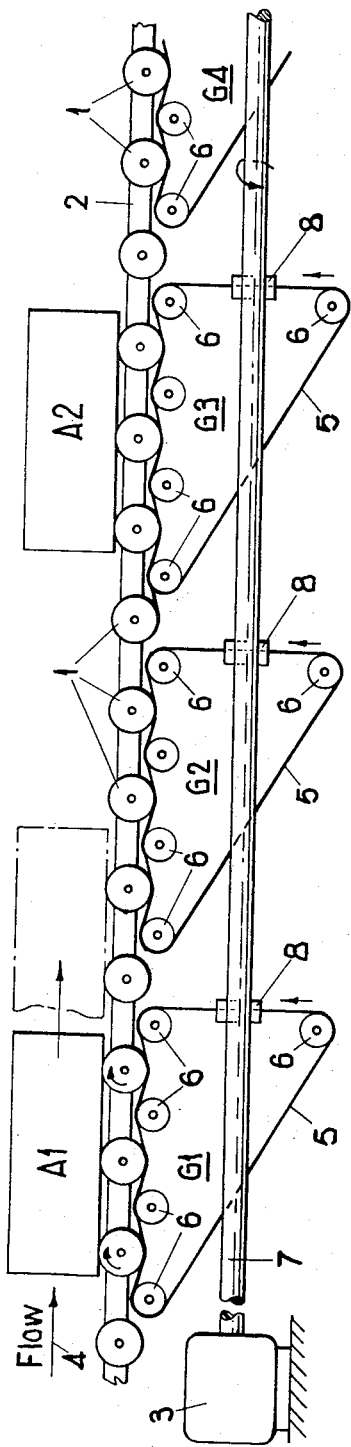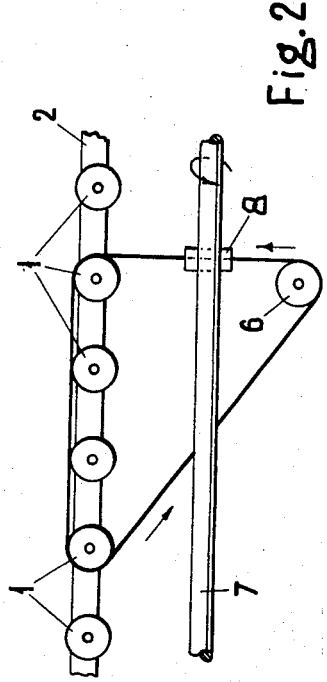
Fig.1
Fig.2

CONVEYORS

This invention relates to conveyors, and more especially to conveyors of the kind incorporating a series of spaced support rollers capable of being driven so as to feed articles along the conveyor.

Such roller conveyors can be used for a variety of articles, being commonly employed, for example, for carrying cartons, boxes, packages, pallets and similar loads.

In use of conveyors of this kind the flow of articles may in some cases need to be arrested at one or more positions along the conveyor line; one way of achieving this is to place a stop in the path of the articles. The conveyor will then act as an accumulating conveyor, and in a simple arrangement articles following a stopped article will continue to move forward until they become arrested in turn by previously stopped articles, thus accumulating behind the first article to be stopped.

The disadvantages of such a simple form of accumulating conveyor is that considerable forward pressure from the accumulated articles builds up, and that although articles may be placed on the conveyor spaced apart, their subsequent release after they have accumulated causes them to move forward in a continuous line without any spacing between them which may be undesirable.

An object of the present invention is to provide a form of accumulation conveyor in which these disadvantages are substantially avoided.

In accordance with the invention in a roller conveyor successive groups of one or more rollers are each associated with individual endless belts, each belt being associated with drive means therefor, and means being provided for pressing each endless belt into contact with respective drive means so as to drive the belt and hence the respective rollers, and means being associated with each group for sensing the presence of an article on the respective roller or rollers and for actuating the belt-pressing means for disengaging the endless belt of the preceding group from the drive means so as to arrest the drive to the roller or rollers of the preceding group.

It will be seen that when an article is stopped on a group of rollers the following article will close up until it reaches the preceding group, whereupon no further driving force will be imparted to it. The following article will not therefore be urged against the first article to be stopped by it and therefore compression of the articles will be avoided. Succeeding articles will be brought to rest and thus accumulate behind the stopped article but build up of pressure on the articles or drive will be avoided. Moreover when the leading article is released the second article will not commence to move forward until the leading article has cleared the sensing means, and spacing between the articles will be maintained.

The endless belts can be of any convenient construction and may be in the form of bands, chains, ropes or the like of any suitable material, although preferably the belts are in the form of a narrow band of any suitable material capable of being flexed.

The drive means is conveniently provided by a shaft coupled to an electric motor or other prime mover, and extending along the conveyor, and the belts of some or all of the groups being arranged to be pressed directly into contact with the peripheral side surface of the shaft. Other forms of drive means could alternatively be used, for example, transverse shafts for each group separately driven or geared to a common longitudinal drive shaft.

Preferably, the belt-pressing means consists of an idler wheel or roller suitably mounted for free rotation and arranged by means normally to be urged towards the drive means but capable of being moved away therefrom against the action of said urging means, the endless belt passing between the drive means and the idler wheel or roller. The urging means for the pressure idler may be provided, for example, by a weighted or spring-loaded pivoted arm which carries the idler, or possibly by the free fall weight of the idler itself mounted at the end of a pivoted arm.

The sensing means could conveniently include an electrical or pneumatic trigger device for sensing the presence of an article on the group of rollers, and associated electrically, pneumatically or hydraulically operated devices for actuating the belt-pressing means of the preceding group, although preferably the sensing means comprises a mechanical trip member operable by an article and connected by suitable link means to the belt-pressing means of the preceding group.

Figure 4:
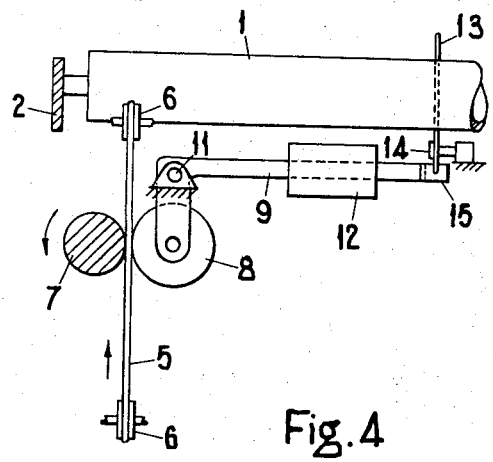

One embodiment of the invention will now be described by way of example with reference to the accompanying diagrammatic drawings in which:

FIG. 1 is a side elevation of an arrangement for a roller conveyor according to the invention, FIG. 2 is a side elevation of a slightly modified drive arrangement, FIG. 3 is an enlarged detailed side elevation of a part of the arrangement shown in FIG. 1, and FIG. 4 is a part sectional end elevation on the line IV—IV of FIG. 3.

Referring first to FIG. 1, the roller conveyor consists generally of a plurality of gravity rollers 1 mounted for free rotation between spaced side frame members 2 so as to provide a plane conveying surface for the transportation of articles A1, A2, etc., therealong in the direction indicated by the arrow 4. For this purpose, each group G1, G2, G3, G4, etc., of three rollers 1 to each group, are driven by an endless rubber belt 5, preferably of circular cross-section of between 6 to 10 mm diameter, which passes over a respective group of five idler wheels 6, four of which maintain the belt 5 in driving engagement with the undersides of the respective rollers 1 of the group, and the fifth wheel 6 of which provides for a vertical run of the belt 5 perpendicular to the conveying surface.

In a modification of this arrangement, shown in FIG. 2, each group of four rollers 1 to each group are driven directly by a belt 5 which passes over the four rollers and a respective single idler wheel 6 to provide said vertical run for the belt.

A shaft 7, mounted in bearings one at each end of the conveyor (not shown), is rotatably driven by an electric motor 3 and extends perpendicularly across all the vertical runs of the belts 5 and in close proximity thereto. The belts 5 (and hence each group of rollers 1) are driven by being pressed into engagement with the peripheral surface of the rotating shaft 7 by a respective pressure roller 8.

Referring also to FIGS. 3 and 4, each pressure roller 8 is journaled for free rotation at one limb end of a cranked arm 9 which is pivotally mounted at 11 and is provided with a weight 12 on its other limb. Thus, the weighted pressure roller 8 normally maintains the belt in driving engagement with the shaft 7, the pressure exerted therebetween being adjustable if desired by shifting the position of the weight on the arm 9. The rotational speed of the rollers 1 may be varied by altering the speed of rotation of the shaft 7 or the diameter thereof.

In order to provide for the desired spacing of articles A1, A2 etc., flowing on an accumulation conveyor system according to the present invention, each group G1, G2, G3, G4 etc., of rollers includes a mechanical sensor device comprising a sensing lever 13 pivotally mounted at 14 and shaped at one end at which it is arranged to project into the path of the moving articles, and slidably linked at its other end to the free end 15 of the arm 9 carrying the pressure roller 8 of the preceding group.

Thus, it will be seen that when an article, e.g. A2 is moved onto a group of rollers, e.g. G3, the respective sensing lever 13 of that group is depressed and causes the end 15 of the arm 9 to be raised about its pivot 11 whereby to disengage the pressure roller 8 of the preceding group of rollers, i.e., G2, from its respective belt 5 against the action of its weight 12 so as to discontinue the drive to the group G2 rollers. This prevents any further movement of a following article A1 by the group G2 rollers until the article A2 on group G3 has been moved on to the next group G4 whereby to release the sensing lever 13 of group G3 and to restore the drive to the preceding group G2.

A particular advantage with such an arrangement is that a queue of articles with desired spacing therebetween can be maintained or even initiated if required by introducing a physical barrier at any selected point along the conveyor, which barrier will halt an article which itself will then set in motion progressive disengagement of the belt drives of each preceding group of rollers in turn as the following articles flow along and are stopped at, the successive groups of rollers of the conveyor.

The articles may rest on top of the rollers directly, the endless belts engaging the lower surfaces of the rollers, or alternatively the belts may themselves by supported on the rollers and provide supports for the articles.

I claim:
1. A roller comprising
   A. successive groups of one or more article-supporting rollers
      i. arranged in series along the length of the conveyor,
   B. individual endless belts associated with each group of rollers,
   C. a driveable shaft extending lengthwise of the conveyor,
   D. means for pressing the belts of some or all of the groups of rollers into tangential driving contact with the surface of the shaft to drive the belts and hence the respective rollers,
   E. sensing means associated with each group of rollers for sensing the presence of an article on the respective roller or rollers, and
   F. means, actuatable by the said sensing means, for disengaging the endless belt of the preceding group from the shaft so as to arrest the drive to the roller or rollers of the preceding group.

2. A roller conveyor according to claim 1, wherein the endless belt is in the form of a narrow band.

3. A roller conveyor according to claim 1, wherein the belt-pressing means consists of an idler wheel or roller mounted for free rotation on a movable support and means normally urging the wheel or roller towards the shaft, the endless belt passing between the shaft and said idler wheel or roller, so as normally to be pressed against the shaft by the wheel or roller, and the wheel or roller being movable away from the shaft against the action of said urging means, for disengaging the belt from the shaft.

4. A roller conveyor according to claim 1, wherein the sensing means comprises a mechanical trip member operable in use by the presence of an article carried by the associated group of rollers, and means connecting the trip member to the belt-pressing means of the preceding group of rollers for actuation of the belt-pressing means of said preceding group.

5. A roller conveyor according to claim 1, wherein the endless belt is in the form of a narrow band, the belt-pressing means consists of an idler wheel or roller mounted for free rotation on a movable support and means normally urging the wheel or roller towards the driveable shaft with the band passing between the wheel or roller and the shaft, and the wheel or roller being movable away from the shaft against the action of said urging means, and wherein the sensing means comprises a mechanical trip member, operable in use by the presence of an article carried by the associated group of rollers, and means connecting the trip member to the idler wheel or roller of the preceding group of rollers for actuation of the idler wheel or roller of said preceding group.

* * * * *